Aug. 4, 1959     S. U. PATTON     2,898,164
BEARING CONSTRUCTION WITH EDGE LOAD RELIEF
Filed July 2, 1952
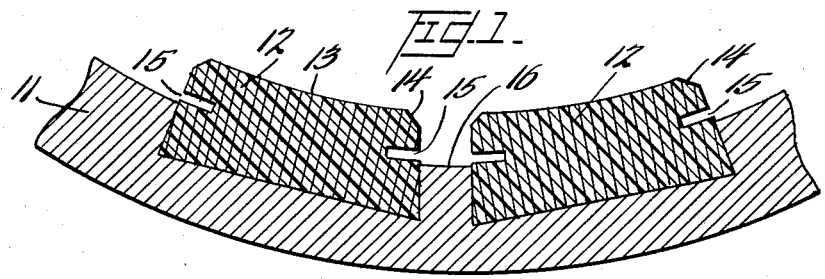
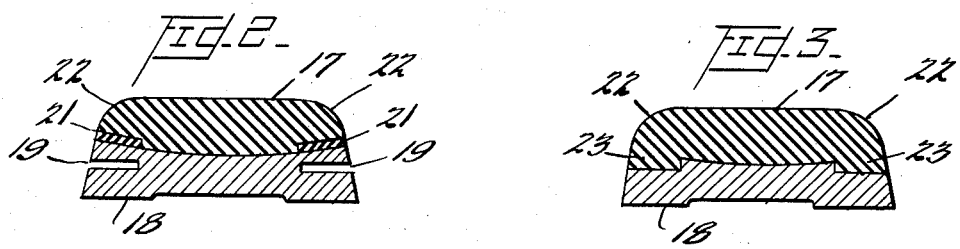
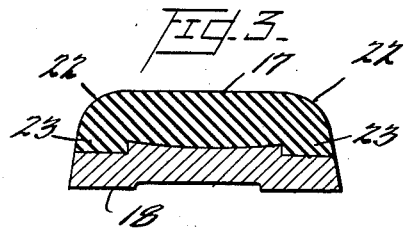
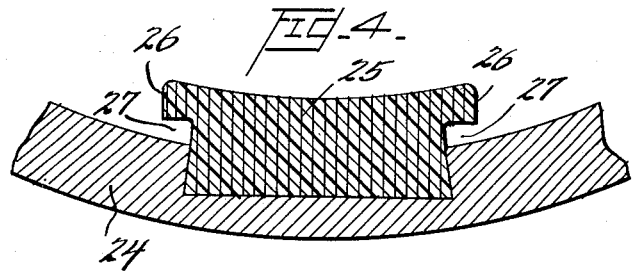
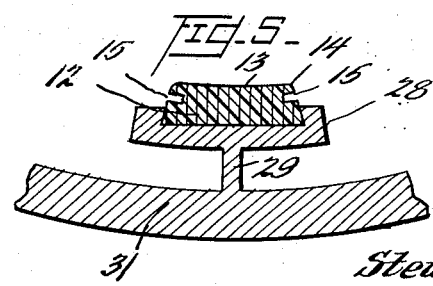
INVENTOR
Stewart U. Patton,
BY George Sipkin
B. L. Zangwill
ATTORNEYS United States Patent Office 2,898,164
Patented Aug. 4, 1959

2,898,164

BEARING CONSTRUCTION WITH EDGE LOAD RELIEF

Stewart U. Patton, Severna Park, Md.

Application July 2, 1952, Serial No. 296,977

2 Claims. (Cl. 308—238)

(Granted under Title 35, U.S. Code (1952), sec. 266)

The invention described herein may be manufactured and used by or for the Government of the United States of America for governmental purposes without the payment of any royalties thereon or therefor.

This invention relates to bearing lubrication and more particularly to means for increasing the entry of ambient lubricant into a stave-type bearing by relieving bearing pressure at the leading edge of the stave.

Numerous arrangements have been proposed and tried for the purpose of increasing the flow of lubricant into and through a bearing, including beveled edges of bearing staves or bearing half-cylinders, pressure feed systems for forcing lubricant into grooves within the bearing surface, and like arrangements. However, it is found that prior systems do not permit adequate lubrication under conditions of high unit bearing load. An example of severe service requirements for which no satisfactory means has been available is in the strut bearings for propeller shafts whereof the ambient lubricant is the water in which the propeller shaft is immersed. Under such conditions it has been found that no satisfactory lubrication with grease, oil or other similar lubricants is possible. Current practice employs rubber or plastic staves with water as lubricant rather than an oil film. It is well known that water makes a good lubricant only if it can be supplied in a continuous film.

Experience has shown, furthermore, that conventional stave bearings must be relatively narrow so as to occupy a minor portion of the circumference of a journal bearing, thereby to provide more channels for the entry of water into the bearings. Rounding or beveling the edges of the staves has been found to provide some increase in the entry of water into the bearing, but satisfactory results are not achieved thereby. Furthermore, under many conditions of use, it is found that the bearing material must be of soft resilient elastomer material such, for example, as rubber, plastic or the like which are better able to maintain bearing tightness than metal bearings under conditions of abrasive wear. These materials may also wear down rapidly under heavy load, particularly when insufficiently lubricated. As a result a bearing stave, which at first makes only line contact with the rotating shaft supported thereby, is soon worn sufficiently that the contact with the shaft extends substantially throughout the surface of the stave. Therefore, a bearing stave which is provided with a surface making a low angle contact with the shaft so as to provide a thin lubricant wedge area to assure water entry into the bearing, soon develops a sharp wiping edge therealong at the leading edge of the stave in contact with the shaft. This circumstance of wear causes the water or other lubricant to be wiped clean from the shaft as the shaft rotates against the stave, the low angle wedge being eliminated and its effect destroyed. Thereafter the stave bearing operates with insufficient lubricant.

An additional reason for requiring a continuous lubricating film in a bearing is for some purposes of greater importance than the wear, particularly with rubber and other soft elastomer faced bearings in that a high unit loading of the bearing surface, with insufficient lubricant, results in bearing squeal. This is highly objectionable particularly in naval service where it is necessary to maintain quiet operation of a vessel to prevent detection thereof by enemy listening devices. The squeal from such bearings may represent a principal noise output from the vessel. Nevertheless, bearings employing rubber or plastic surfaces have sufficient other desirable characteristics to substantially dictate their use.

It is accordingly an object of this invention to provide means insuring the entry of adequate quantities of ambient lubricant between the bearing surfaces of a journal type bearing.

A further object is to provide means for maintaining conditions conducive to entry of ambient lubricant into a journal bearing after the bearing surface has become worn.

A still further object is to provide pressure relief at the leading edge of a bearing stave whereby positive pressure of limited amount exists between bearing surfaces to facilitate entry of lubricant at the leading edge thereof.

A still further object is to provide additional means causing lubricant to enter a bearing of the pivoted or pressure equalizing type.

Yet another object is the provision in a resilient type bearing of additional resilience at the leading edge of a bearing section to provide forced entry of lubricant regardless of condition of wear of the bearing section.

Other objects and advantages of the invention will hereinafter become more fully apparent from the following description of the annexed drawings, which illustrate preferred embodiments; and wherein:

Fig. 1 is a transverse section of a portion of a journal bearing having laminated plastic staves forming bearing surfaces with pressure relief at the edges thereof, Fig. 2 illustrates in a sectional view a stave according to the present invention having a metallic base with an undercut portion and a rubber stave face with further edge pressure relief means, Fig. 3 represents in a sectional view a typical stave with a metallic base, a rubber face and means relieving edge pressure, Fig. 4 illustrates in a sectional view an additional plastic type stave set in a journal bearing and having overhanging edge portions for edge pressure relief, and Fig. 5 illustrates in cross section a pressure equalizing stave mounting, the stave having additional edge pressure relief means to assure entry of lubricant.

Referring to the drawings, wherein like reference characters designate like or corresponding parts throughout the several views, there is shown in Fig. 1 at 11 a journal bearing housing composed ordinarily of metal and usually cylindrical in shape. Mounted within the journal 11 is a stave 12 composed of elastomer or resilient material and preferably of trapezoidal shape for locking purposes and having an inner surface 13 cut to the approximate radius of curvature of the shaft supported by the bearing. At the leading edge, or at both edges in case of rotation in either direction, there is provided ordinarily a bevel or radius 14 for the purpose of facilitating entry of lubricant into the bearing as the shaft rotates against the stave 12. It will be understood that when the bevel 14 is arcuate in shape and while still new, a low angle wedge is formed between the shaft lying along surface 13 and the bevel 14. However, since some wear takes place a sharp edge is formed and the low angle wedge is lost. When this occurs water or other lubricant will be wiped clean from the shaft as it rotates against surface 13, the sharp edge of the bevel 14 being particularly deleterious with lubricants of thin consistency, such as water. In accordance with the present invention, means is provided for relieving the pressure at the leading edge, or at both edges, by undercutting the surface of the stave as at 15. The depth of penetration of the grooves 15 is made sufficient to extend appreciably beyond the bevel 14 but to occupy as little of the stave width as is practicable in order to maintain as large a portion of the stave width as possible for bearing surface so as to not adversely affect the support of the shaft. The thickness of each groove 15 is only sufficient to permit slight deflection of the surface 13 from the shaft adjacent to the bevel 14. By this means a portion adjacent to bevel edge 14 is provided with a resilient backing such that pressure of the shaft against the stave results in flexing the undercut portion of the stave sufficiently that the lubricant is not wiped clean as the shaft rotates. It is found that lubricants are forced out of bearing surfaces with considerable difficulty and exert a considerable force against the surface of the bearing.

The staves of Fig. 1 are normally set within the backing 11 fairly close together leaving at the sides thereof a narrow portion 16 of backing material which effectively keys the trapezoidal shaped staves in place. The grooves 15 are formed between the portion 16 and the surface 13, the relative location thereof being selected to provide the appropriate degree of flexibility for the particular ambient lubricant employed. When the lubricant is non-viscous, as with water, a greater flexibility is required of the stave portion above the undercut 15 than is required where the stave is operated in a more viscous lubricant.

Fig. 2 illustrates a conventional type of bearing stave for use with propeller shafts wherein a metal stave element 18 is adapted for securing in a journal surface in the same manner as in Fig. 1, or in any other convenient manner, except that additional means for relieving edge pressure has been incorporated. The metal backing 18 is illustrated with slots 19 cut longitudinally along the stave underneath the leading edge thereof. With this arrangement the rubber face 17 having the arcuately beveled edge 22 is provided with means whereby the pressure is relieved particularly at the leading edge even though the rubber face 17 is worn down sufficiently that the bevel portion 22 forms a sharp wiping edge at the point of contact with the shaft rotating thereagainst. The pressure employed on bearings of this type is generally very high and causes rapid wear of the rubber face until cylindrical contact is made substantially throughout the width of the stave. When a sharp edge is thereby developed the pressure is sufficiently high that the lubricant is wiped substantially clean from the rotating shaft. Providing a wider and more gradual bevel at 22 to delay the formation through wear of a wiping edge is not effective in securing continued lubrication for the reason that the edge portion in contact with the shaft is more strongly supported than with a rubber face not having a beveled edge. To provide pressure relief at the leading edge the slots 19 are provided along the leading edge of the stave near the junction between the rubber backing and the face. Accordingly the metal backing is itself made resilient at the leading edge and during rotation of the shaft the pressure is thereby relieved sufficiently to permit entry of water into the space between the rubber and the shaft.

There is also illustrated in Fig. 2 a second means of relieving the bearing pressure at the leading edge which may be employed in lieu of, or in addition to, the slots 19. A resilient strip of material 21 is provided between the rubber face and the backing to which it is bonded, which may be of softer rubber or plastic than the face 17. This strip, like the slots 19, provides pressure relief between the face 17 and the shaft.

Fig. 3 illustrates a further means of relieving pressure at one or both edges of the stave wherein a rubber face 17 and a bevel portion 22 are employed and a thickened portion of the rubber face material 23 is provided within a cutout portion of the base 18. If the rubber is forced into contact with the shaft some cold flow thereof occurs which is ordinarily observed only at the edges since these portions are unsupported to the same degree as the interior portions. The rubber face material is of relatively firm rubber to support heavy loading and insufficient pressure relief is provided to prevent entry of sufficient water to a water lubricated bearing. The insert portion 23 provides an increased tendency for the rubber to relieve itself under pressure along the edge thereof while still maintaining full pressure throughout the central portion of the stave whereby the load normally carried by the stave can be supported.

Fig. 4 illustrates a further modification of the stave of Fig. 1 wherein the journal backing material 24 corresponds to 11 of Fig. 1 and the stave material 25 may be similar to the stave material 12. This may be composed of laminated plastic and fabric material disposed with the grain thereof running substantially perpendicular to the shaft face. In Fig. 4 this laminated plastic material extends over and beyond the base portion thereof at 26 thereby providing an unsupported edge portion having slots 27 corresponding to slots 15 of Fig. 1 formed by removing the stave material of Fig. 1 below slots 15 and broadening the keys 16.

In Fig. 5 a bearing stave 12 is illustrated having the beveled portion 14 and undercuts 15 as in Fig. 1. The stave of Fig. 2 or Fig. 3 may be used in place of that of Fig. 1. In either case the stave is supported by metal backing 28 secured to the journal 31 by a flexible metallic member 29 whereby the stave is caused to assume proper contact with the shaft, and, as heretofor proposed, the backing member 28, flexible member 29, and journal 31 perform a pressure equalizing function which to a certain degree facilitates entry of liquid lubricant into the bearing because of the tendency of lubricant to force the leading edge portion of the surface 13 away from the shaft. However, this previous flexible or self-adjusting structure alone has been found to provide insufficient lubrication. In Fig. 5 there is provided in addition to the pressure equalizing function of the flexible portion 29 the further means comprising the undercut portion 15 and insuring an adequate supply of lubricant.

While in each of the illustrations both edges of the stave are provided with pressure relieving means, it will be understood that this arises from the necessity, under some circumstances, to operate the shaft in both directions of rotation, and that if a single direction is sufficient, the pressure relieving means would preferably be supplied only at the leading edge.

It will thus be seen that means has been provided for relieving leading edge pressure under a plastic or resilient bearing stave sufficient to increase the resilience thereof and provide positive "dragging in" of lubricant from the leading edge of the stave across the surface thereof to prevent rapid wear, squeal and other factors adversely affecting bearing performance. By the use of undercutting in relatively rigid stave material a slight resilience is produced. Edge flexibility is also applied by slotting the metal backing of a rubber-faced or plastic-faced bearing stave. Where a resilient material forms the bearing face the edge resilience may likewise be increased by increasing the resilient edge thickness, while, at the same time, retaining the necessary stiffness throughout substantially the full width of the stave to withstand the required load. On each of the arrangements illustrated, consideration is given to the normal loading of the bearing stave which results in deflection thereof sufficiently to provide a sharp wiping edge at the leading edge of the stave, at least after the bearing has become "worn in." The degree of resilience herein described as being achieved by slotting or undercutting the leading edge, or by inserting a more resilient strip material thereunder, is limited to a few thousandths of an inch or less, since this provides an adequate pressure relief whereby lubricant is forced into the bearing all along the leading edge of the stave. The construction described thereby provides longer life for bearings especially of the water-lubricated type and markedly improves the resistance thereof to a tendency to squeal under conditions of heavy load.

Various modifications are contemplated and may obviously be resorted to by those skilled in the art without departing from the spirit and scope of the invention, as hereinafter defined by the appended claims, only preferred embodiments being disclosed.

What is claimed is:

1. A bearing for supporting a rotatable shaft comprising a journal bearing housing, a plurality of spaced longitudinally extending staves attached to the inner peripheral portion of said housing for supporting a shaft adapted to rotate therein, each of said staves comprising a metal backing plate having sides and a face secured to said journal bearing housing, a plastic member attached to said plate having sides and a face adapted for contact by said shaft, a beveled edge joining said sides and said face of said plastic member, and pressure relieving means in the side portions of said plastic member for relieving the pressure on said edges caused by said shaft when the latter is rotated, thereby providing access for flow of a lubricant across said staves, said pressure relieving means comprising a slot formed in each side of said plastic member and extending the length thereof, and a strip of material of greater compressibility than said plastic member positioned in said slots for relieving the pressure caused by said shaft on said edges.

2. A bearing for supporting a rotatable shaft comprising a journal bearing housing, a plurality of spaced longitudinally extending staves attached to the inner peripheral portion of said housing for supporting a shaft adapted to rotate therein, each of said staves comprising a metal backing plate having sides and a face secured to said journal bearing housing, a plastic member attached to said plate having sides and a face adapted for contact by said shaft, a beveled edge joining said sides and said face of said plastic member, and pressure relieving means in the side portions of said plastic member for relieving the pressure on said edges caused by said shaft when the latter is rotated, thereby providing access for flow of a lubricant across said staves, said pressure relieving means comprises a first slot formed in each side of said plastic member and extending the length thereof, a strip of flexible material in the first slots, and a second slot cut in the sides of said metal backing member and extending the length thereof, whereby the pressure of said shaft on said edges is relieved by the coaction of said first and second slots.

References Cited in the file of this patent

UNITED STATES PATENTS

| | | |
|---|---|---|
| 1,688,519 | Bohm | Oct. 23, 1928 |
| 1,885,339 | Evans | Nov. 1, 1932 |
| 2,393,017 | Boyd et al. | Jan. 15, 1946 |
| 2,424,028 | Haeberlein | July 15, 1947 |

OTHER REFERENCES

Rubber Age, vol. 65, No. 2, May 1949, pages 173 to 179.